United States Patent
Yoshizawa et al.

(10) Patent No.: US 8,105,978 B2
(45) Date of Patent: Jan. 31, 2012

(54) THERMAL TRANSFER INK SHEET, INK CARTRIDGE, COATING COMPOSITION FOR DYE LAYER OF THERMAL TRANSFER INK SHEET, AND THERMAL TRANSFER RECORDING METHOD

(75) Inventors: Masataka Yoshizawa, Kanagawa (JP); Naotsugu Muro, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 923 days.

(21) Appl. No.: 12/056,729

(22) Filed: Mar. 27, 2008

(65) Prior Publication Data
US 2008/0241434 A1 Oct. 2, 2008

(30) Foreign Application Priority Data

Mar. 30, 2007 (JP) .................. 2007-092240

(51) Int. Cl.
*B41M 5/035* (2006.01)
*B41M 5/50* (2006.01)
(52) U.S. Cl. .................. 503/227; 8/471; 523/161
(58) Field of Classification Search .................. None
See application file for complete search history.

(56) References Cited

FOREIGN PATENT DOCUMENTS

| | | |
|---|---|---|
| EP | 0 495 439 A2 | 7/1992 |
| EP | 1 429 400 A2 | 6/2004 |
| GB | 940 199 A | 10/1963 |

OTHER PUBLICATIONS

An extended European Search Report dated Jul. 11, 2008.

*Primary Examiner* — Bruce H Hess
(74) *Attorney, Agent, or Firm* — Sughrue Mion, PLLC

(57) ABSTRACT

A thermal transfer ink sheet comprising, as formed on a support, a dye layer containing a thermal transferable dye in a resin binder, wherein the dye layer contains a polyvinyl acetal modified with at least one compound of the following formula [1]:

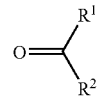

[1]

wherein $R^1$ is a substituted linear alkyl group, a substituted branched alkyl group, or a substituted or unsubstituted cyclic group, and $R^2$ is a hydrogen atom, a substituted or unsubstituted linear alkyl group, a substituted or unsubstituted branched alkyl group, or a substituted or unsubstituted cyclic group.

10 Claims, No Drawings

THERMAL TRANSFER INK SHEET, INK CARTRIDGE, COATING COMPOSITION FOR DYE LAYER OF THERMAL TRANSFER INK SHEET, AND THERMAL TRANSFER RECORDING METHOD

BACKGROUND OF THE INVENTION

1. Field of the Invention

The present invention relates to a thermal transfer ink sheet containing a polyvinyl acetal having a specific structure, and to an ink cartridge, a coating composition for dye layer of thermal transfer ink sheet, and a thermal transfer recording method.

2. Background Art

These days, in particular, a color image-forming material is the mainstream of an image-recording material; and concretely, inkjet-type recording materials, thermal transfer-type image-recording materials, electrophotographic recording materials, transfer-type silver halide photosensitive materials, printing inks and recording pens are much used.

Thermal transfer recording includes a recording system where a thermal transfer material having a thermofusible ink layer formed on a base film (support) is heated with a thermal head to thereby melt the ink for recording on an image-receiving material, and a recording system where a thermal transfer material having a thermal transferable dye-containing dye-donating layer formed on a base film is heated with a thermal head to thereby thermally diffuse and transfer the dye onto an image-receiving material. In the latter thermal transfer system, the dye transfer rate may be varied by changing the energy to be applied to the thermal head, therefore facilitating gradation recording, and the system is especially advantageous for high-quality full-color recording.

In the thermal diffusive transfer recording system, a dye-containing thermal transfer sheet (hereinafter this may be referred to as "ink sheet") and a thermal transfer image-receiving sheet (hereinafter this may be referred to as "image-receiving sheet") are put one upon another, and then the ink sheet is heated with a thermal head from which the heat generation is controlled by an electric signal applied thereto, whereby the dye in the ink sheet is transferred onto the image-receiving sheet to attain image information recording thereon. In the system, three colors of cyan, magenta and yellow may be transferred and recorded on the sheet, thereby producing a color image having a continuous color gradation.

An ink sheet polymer plays a role of holding a dye in the thermal transfer sheet, and polyester resins have heretofore been used for it. Polymer materials capable of forming color images of high density are reported in Japanese Patent 3263138 and JP-A 7-32742. These days, however, the increase in the printing speed is extremely great, and the above resins could hardly satisfy both the requirement for the rapid transfer printing speed and the requirement for good photographic properties of high transfer sensitivity.

SUMMARY OF THE INVENTION

The invention is to provide a thermal transfer ink sheet having high sensitivity and capable of giving a good image with few image defects, and to provide an ink cartridge, a coating composition for dye layer of thermal transfer ink sheet, and a thermal transfer recording method.

The present inventors have assiduously studied and, as a result, have found that the above-mentioned objects can be attained by the following constitution:

(1) A thermal transfer ink sheet comprising, as formed on a support, a dye layer containing a thermal transferable dye in a resin binder, wherein the dye layer contains a polyvinyl acetal modified with at least one compound of the following formula [1]:

wherein $R^1$ is a substituted linear alkyl group, a substituted branched alkyl group, or a substituted or unsubstituted cyclic group, and $R^2$ is a hydrogen atom, a substituted or unsubstituted linear alkyl group, a substituted or unsubstituted branched alkyl group, or a substituted or unsubstituted cyclic group with the proviso that when $R^1$ is a monophenyl alkyl group or an unsubstituted phenyl group, $R^2$ is not a hydrogen atom.

(2) The thermal transfer ink sheet according to (1), wherein one of $R^1$ and $R^2$ is a crosslinked cyclic group, a condensed cyclic group, an aliphatic carbon mono-cyclic group or a hetero-cyclic group.

(3) The thermal transfer ink sheet according to (1), wherein one of $R^1$ and $R^2$ is a crosslinked cyclic group or a condensed cyclic group.

(4) The thermal transfer ink sheet according to (1), wherein one of $R^1$ and $R^2$ is a crosslinked alicyclic group or a condensed alicyclic group.

(5) The thermal transfer ink sheet according to (1), wherein $R^1$ is a substituted phenyl group and $R^2$ is a hydrogen atom, a linear alkyl group or a branched alkyl group.

(6) The thermal transfer ink sheet according to (1), wherein $R^1$ is an alkyl substituted phenyl group, an alkoxy substituted phenyl group or a halophenyl group.

(7) The thermal transfer ink sheet according to (1), wherein $R^1$ is a halophenyl group.

(8) An ink cartridge filled with the thermal transfer ink sheet of any one of the above (1) to (7).

(9) A thermal transfer recording method comprising forming an image by use of the thermal transfer ink sheet of any one of the above (1) to (7) on an image-receiving sheet comprising a polymer latex-containing ink-receiving layer on a support.

(10) A coating composition for the dye layer of a thermal transfer ink sheet, containing a thermal transferable dye and a polyvinyl acetal modified with at least one compound of the following formula [1]:

wherein $R^1$ is a substituted linear alkyl group, a substituted branched alkyl group, or a substituted or unsubstituted cyclic group, and $R^2$ is a hydrogen atom, a substituted or unsubstituted linear alkyl group, a substituted or unsubstituted branched alkyl group, or a substituted or unsubstituted cyclic group with the proviso that when $R^1$ is a monophenyl alkyl group or an unsubstituted phenyl group, $R^2$ is not a hydrogen atom.

According to the invention, there are provided a thermal transfer ink sheet having high sensitivity and capable of giving a good image with few image defects, and to provide an ink cartridge, a coating composition for dye layer of thermal transfer ink sheet, and a thermal transfer recording method.

BEST MODE FOR CARRYING OUT THE INVENTION

The thermal transfer recording ink sheet, the ink cartridge, the coating composition and the thermal transfer recording method are described in detail hereinunder.

The description of the constitutive elements of the invention given hereinunder is for some typical embodiments of the invention, to which, however, the invention should not be limited. In this description, the numerical range expressed by the wording "a number to another number" means the range that fails between the former number indicating the lowermost limit of the range and the latter number indicating the uppermost limit thereof.

[Polyvinyl Acetal]

The polyvinyl acetal for thermal transfer ink sheet of the invention use in the invention (hereinafter called "the polyvinyl acetal in the invention") is described. "An acetal" of the polyvinyl acetal in the invention not only means an acetal in a strict sense but also includes an acetal and a ketal.

The polyvinyl acetal in the invention is modified with an aldehyde and/or a ketone of the formula [1]. The polyvinyl acetal in the invention includes a ketal modified with a ketone of formula [1].

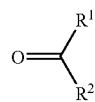

[1]

In formula [1], $R^1$ is a substituted linear alkyl group, a substituted branched alkyl group, or a substituted or unsubstituted cyclic group, and $R^2$ is a hydrogen atom, a substituted or unsubstituted linear alkyl group, a substituted or unsubstituted branched alkyl group, or a substituted or unsubstituted cyclic group with the proviso that when $R^1$ is a monophenyl alkyl group or an unsubstituted phenyl group, $R^2$ is not a hydrogen atom.

In this, the substituted linear alkyl group of $R^1$, the substituted branched alkyl group of $R^1$, the substituted or unsubstituted linear alkyl group of $R^2$ and the substituted or unsubstituted branched alkyl group of $R^2$ are preferably an alkyl group having from 1 to 10 carbon atoms, more preferably from 1 to 5 carbon atoms, even more preferably 1 to 3 carbon atoms. The branched alkyl group of $R^1$ and $R^2$ may be branched at any site of the alkyl chain thereof. For example, it includes a group branched at the carbon atom bonding to the carbonyl group, such as a secondary alkyl group or a tertiary alkyl group, or a group branched at the other carbon atom than that carbon atom (e.g., 2-ethylhexyl group and 2,2-dimethylpropyl group).

The substituted or unsubstituted cyclic group of $R^1$ and $R^2$ may be any cyclic group. Typically it includes an aliphatic carbon cyclic group, an aryl group and a hetero-cyclic group. These groups may have a substituent.

Preferable aliphatic carbon cyclic group are an aliphatic carbon mono-cyclic group such as a cycloalkyl group and a cycloalkenyl group, a crosslinked cyclic group having one or more bridge bond such as a bicyclo ring and a tricycle ring, and a condensed cyclic group condensed with any other ring. Preferable crosslinked cyclic group are a bicyclo[2.2.1]heptane ring, a bicycle[2.2.1]hepta-2-en ring and an adamantane. Preferable condensed cyclic group include a plural aliphatic carbon ring (preferably 5 or 6 membered saturated or unsaturated ring) condensed with each other, an aliphatic carbon ring condensed with an aromatic ring (preferably a phenyl ring) and/or a hetero ring (preferably 5 or 6 membered hetero ring containing at least any one of a oxygen atom, a nitrogen atom and a sulfer atom as a heteroatom). More preferable are a condensed cyclic group of a cyclohexane ring with a cyclopentane ring, a cyclohexane ring, a cyclohexane ring, piperidine ring or a benzene ring. As the crosslinked cyclic group and the condensed cyclic group, an alicyclic group having from 10 to 30 carbon atoms is preferred.

Examples of the aryl group include a benzene ring, a naphthalene ring, an anthracene ring and a phenanthrene ring. A benzene ring is preferred.

The heterocyclic group includes an aromatic hetero ring, a non-aromatic unsaturated or saturated hetero ring. As the heterocyclic group, a 5 or 6 membered hetero ring containing at least one of a oxygen atom, a nitrogen atom and a sulfer atom as a heteroatom is preferred. Typical example of the heterocyclic group is a pyridine ring.

The substituent for the substituted alkyl group or the substituted cyclic group may be any group which can substitute. Examples of the substituent include a hydrocarbon group (an alkyl group, an alkenyl group, an alkynyl group, a cycloalkyl group and a cycloalkenyl group), an aryl group, a heterocyclic group, a halogen atom, a nitro group, a cyano group, a mercapto group, a hydroxyl group, an alkoxy group, an allyoxy group, an alkylthio group, an arylthio group, an amino group, an alkylamino group, an arylamino group, a heterocyclic amino group, a hydroxyl amino group, an acylamino group, a sulfone amide group, a carbamoyl group, a sulfamoyl group, an acyl group, an acyloxy group, an alcoxycarbonyl group, an aryloxycarbonyl group, a carboxyl group, a slufo group, an alkylslufonyl group, a arylslufonyl group, an ureido group, an urethane group, an alkylslufonyloxy group, arylslufonyl group and etc. In those, preferred are an aryl group and a heterocyclic group.

Among them, the alkyl containing substituents are preferably those having an alkyl group with from 1 to 10 carbon atoms, more preferably from 1 to 5 carbon atoms, even more preferably from 1 to 3 carbon atoms. The aryl containing substituents are preferably those having an aryl group with from 6 to 30 carbon atoms, more preferably from 6 to 20 carbon atoms, even more preferably from 6 to 10 carbon atoms. The heterocyclic group containing substituents are preferably those having a heterocyclic group with from 4 to 30 carbon atoms, more preferably from 4 to 20 carbon atoms, even more preferably from 5 to 10 carbon atoms. The alkenyl or alkynyl group containing substituents are preferably those having from 2 to 30 carbon atoms, more preferably from 2 so 20 carbon atoms, even more preferably from 2 to 10 carbon atoms. The cycloalkyl or cycloalkenyl group containing substituents are preferably those having from 5 to 30 carbon atoms, more preferably having from 5 to 20 carbon atoms, even more preferably having from 5 to 10 carbon atoms.

Preferable aryl substituted alkyl groups are an alkyl group substituted by two or more aryl groups, an alkyl group substituted by a substituted aryl group, and an alkyl group substituted by an aryl group and other group. In case where $R^1$ is an aryl substituted alkyl group or an unsubstituted phenyl group, $R^2$ is preferably a substituted or unsubstituted linear alkyl group, a substituted or unsubstituted branched alkyl group, or a substituted or unsubstituted cyclic group.

In the formula [1], $R^1$ is preferably a substituted or unsubstituted cyclic group, more preferably a crosslinked cyclic group, a condensed cyclic group, an aliphatic carbon monocyclic group (a cycloalkyl group or a cycloalkenyl group is preferred and 5 or 6 member is preferred) or a hetero-cyclic group (preferably 5 or 6 membered hetero ring containing at least any one of a oxygen atom, a nitrogen atom and a sulfer atom as a heteroatom), even more preferably a crosslinked cyclic group (preferably a crosslinked alicyclic group having from 10 to 30 carbon atoms), a condensed cyclic group (preferably a condensed alicyclic group having from 10 to 30 carbon atoms). In this, $R^2$ is preferably a hydrogen atom.

A compound of the formula [1] preferably contains both branched alkyl group and cyclic group (for example, a cyclic group substituted branched alkyl group), and/or a heterocyclic group, more preferably a heterocyclic group.

In the formula [1], $R^1$ is also preferably a substituted phenyl group. In this, $R^2$ is preferably a hydrogen atom or a linear or branched alkyl group, more preferably a hydrogen atom.

The substituent of the substituted phenyl group may be any group which can substitute. Typical examples are the substituent exemplified above as the substituent for an alkyl group or a phenyl group. It is preferably a hydrocarbon group (preferably a alkyl group), an aryl group, an alkoxy group, a halogen atom or a cyano group, more preferably a hydrocarbon group (preferably a alkyl group), an alkoxy group or a halogen atom, even more preferably a halogen atom, most preferably a chlorine atom.

Each preferable range of these groups is the same as the range of the groups described in the substituent for an alkyl group or a phenyl group.

In the substituted phenyl group, the phenyl ring has one or more substituents. The phenyl ring may have two or more kinds of substituents. The number of the substituents on the phenyl ring is preferably from 1 to 3, more preferably 1 or 2, even more preferably 1.

As the linear or branched alkyl group in $R^2$ in this case, it is the same as the alkyl group described above.

Specific examples of the compounds of formula [1] are shown below; however, the compounds of formula [1] for use in the invention should not be limited to these.

A-1

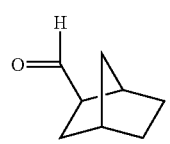

A-2

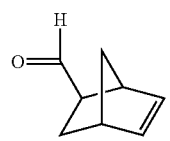

A-3

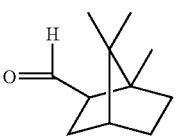

A-4

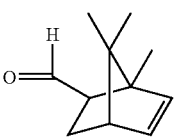

-continued

A-5

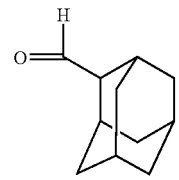

A-6

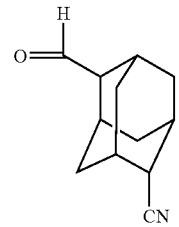

A-7

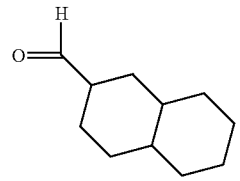

A-8

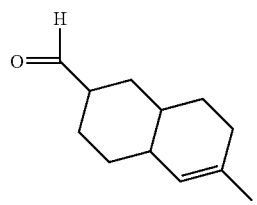

A-9

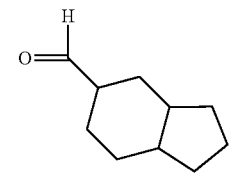

A-10

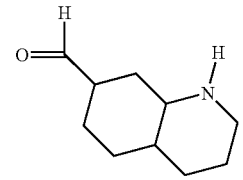

A-11

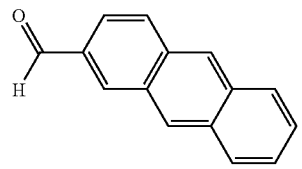

A-12

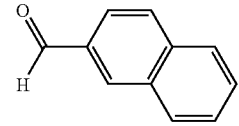

A-13

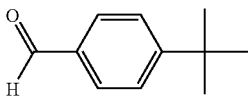

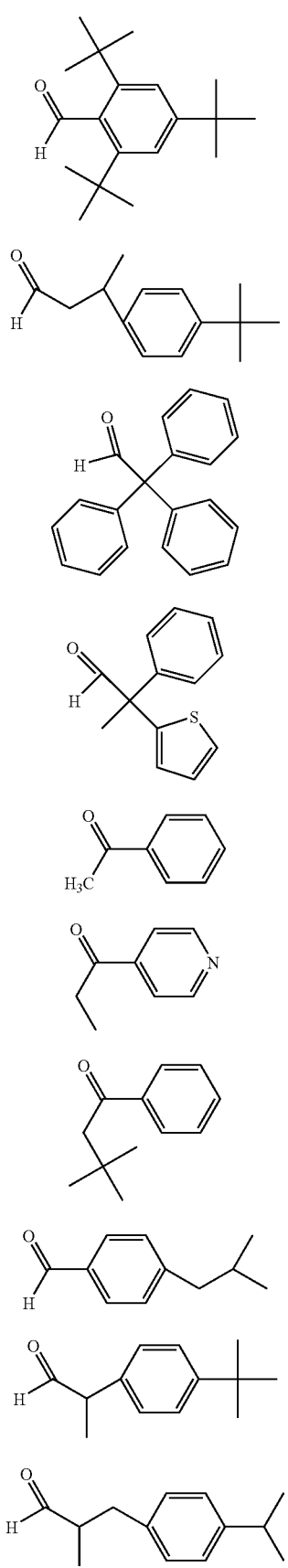
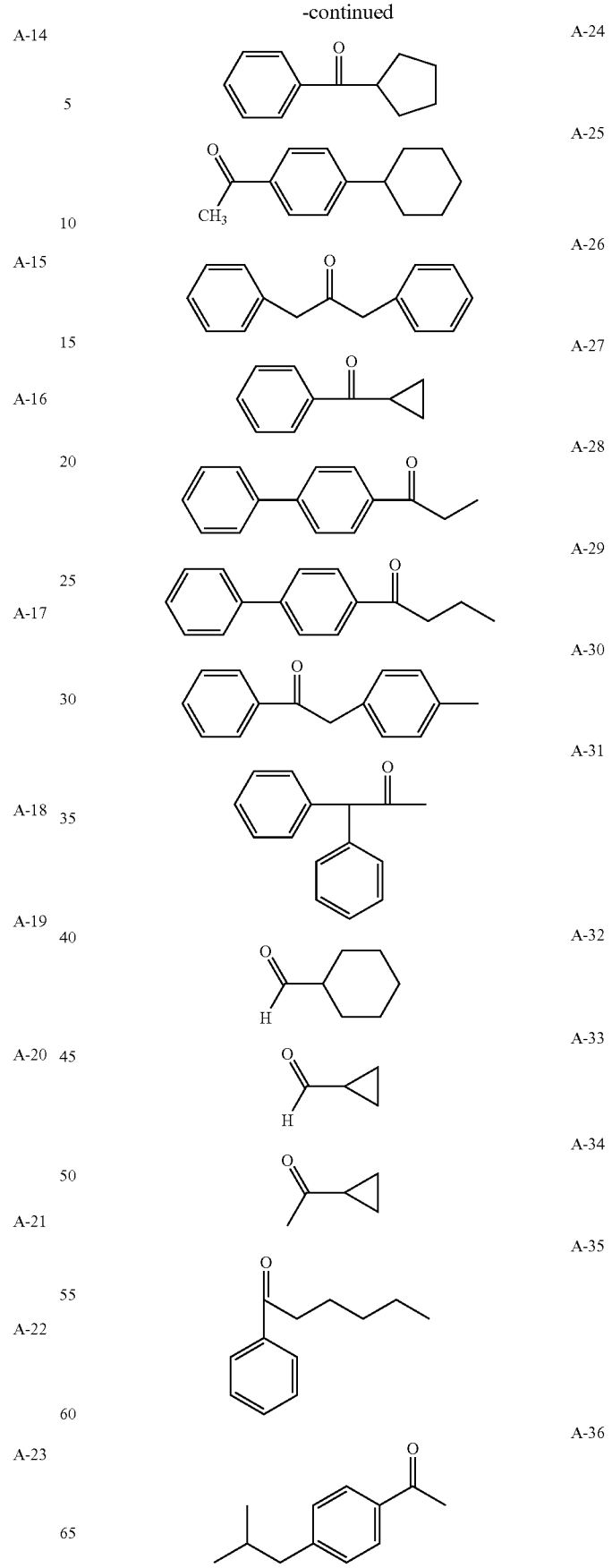

-continued
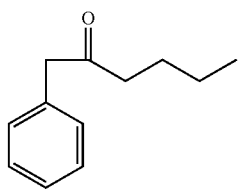
A-37
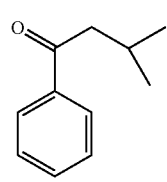
A-38
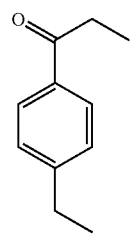
A-39
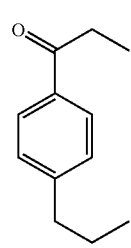
A-40
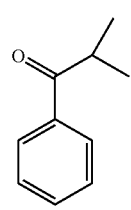
A-41
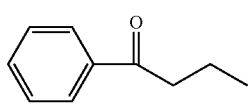
A-42
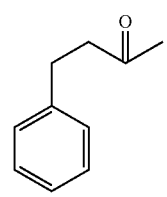
A-43
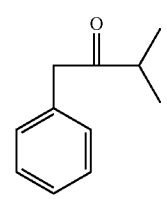
A-44
-continued
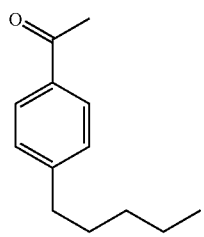
A-45
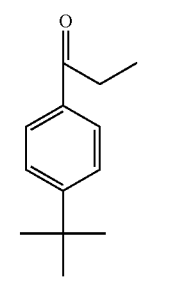
A-46
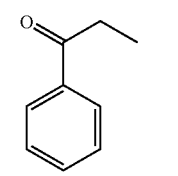
A-47
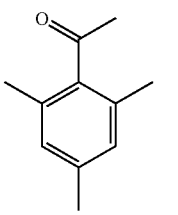
A-48
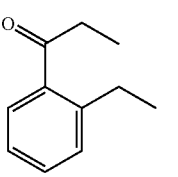
A-49
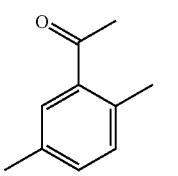
A-50
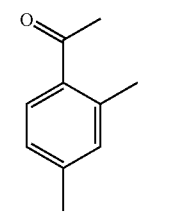
A-51
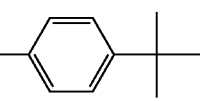
A-52

-continued

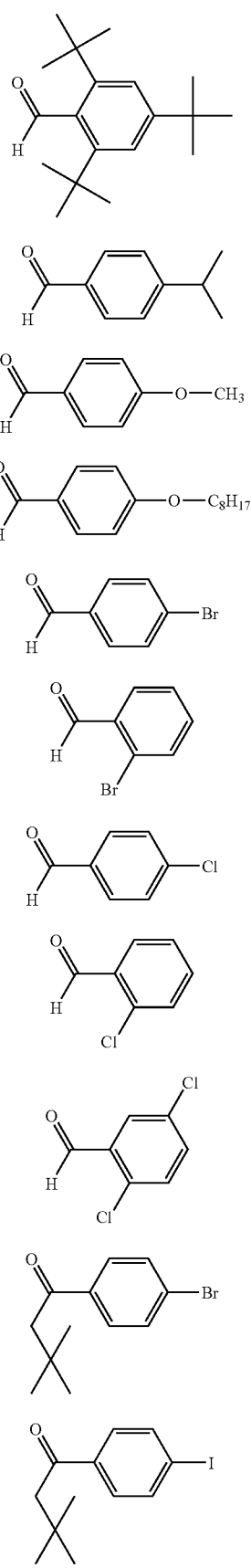

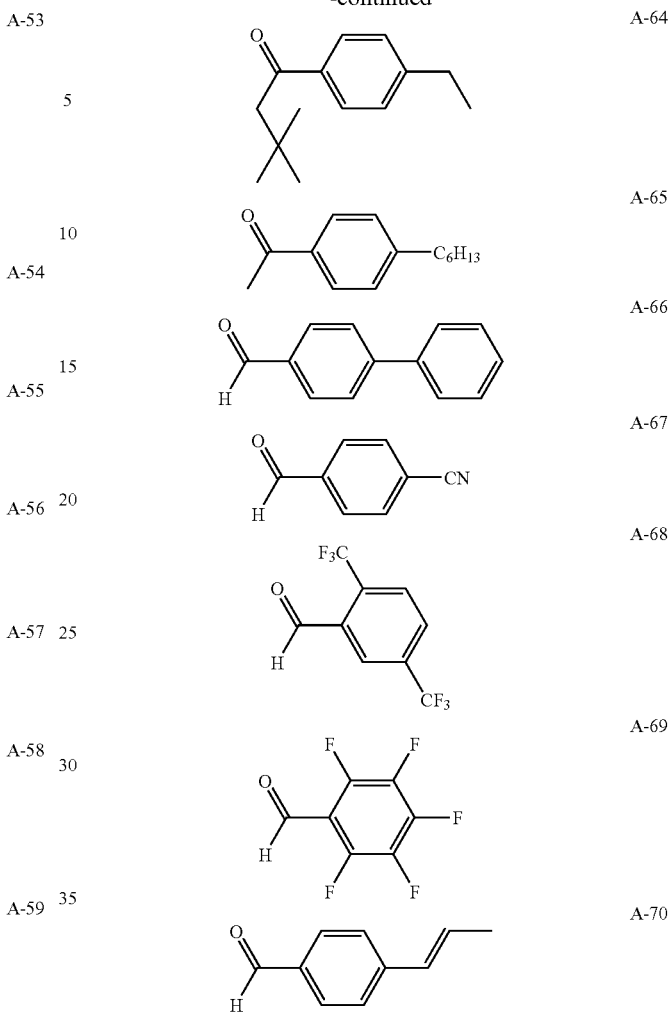

The amount of the compound of formula [1] that constitutes the polyvinyl acetal modified by the compound represented by the formula [1] is preferably from 10% by mass to 100% by mass based on all the polymerization units to constitute the polymer, more preferably from 30% by mass to 95% by mass, even more preferably from 50% by mass to 90% by mass.

If desired, two or more different types of the compounds of formula [1] may be used herein, as combined.

Preferably, the mass-average molecular weight of the polyvinyl acetal modified by the compound represented by the formula [1] is from 3,000 to 500,000, more preferably from 6,000 to 300,000, even more preferably from 8,000 to 200,000.

The mass-average molecular weight and the molecular weight as referred to herein are polystyrene-based molecular weights determined through detection with a differential refractiometer in a solvent of THF, using a GPC analyzer with a column of TSK gel GMHxL, TSK gel G4000HxL, TSK gel G2000HxL (all trade names by Toso).

In general, the polyvinyl acetal modified by the compound represented by the formula [1] is prepared by reacting a polyvinyl alcohol with an aldehyde and/or a ketone, using an acid catalyst, in water or in an organic solvent. In this, only a compound of formula [1] may be used as the aldehyde and/or the ketone; or a compound of formula [1] may be combined with an aldehyde and/or a ketone not represented by the formula [1].

The acid catalyst for acetalization includes an inorganic acid such as hydrochloric acid, sulfuric acid, phosphoric acid; as well as acetic acid, p-toluenesulfonic acid, etc. The amount of the catalyst to be used is preferably from 0.005 to 0.2 mols relative to 1 mol of the aldehyde and/or ketone for the reaction.

The acetalization temperature may be from 20° C. to 100° C. or so, preferably from 40° C. to 90° C.

Specific examples of the structures of the polyvinyl acetal modified by the compound represented by the formula [1] are shown below, to which, however, the invention should not be limited. In the formulae, the numerals indicate the ratio by mass of the constitutive monomer components. Mw means a mass-average molecular weight.

AP-1
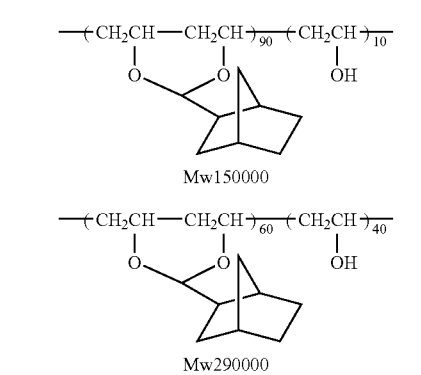
Mw150000

AP-2
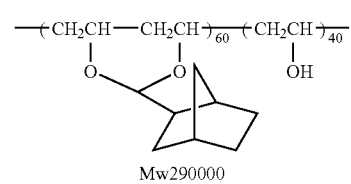
Mw290000

AP-3
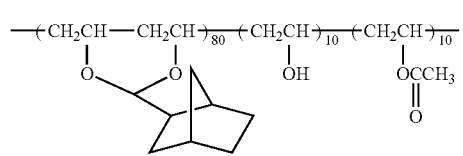
Mw300000

AP-4
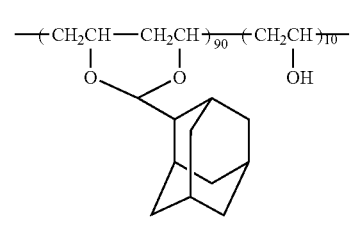
Mw20000

AP-5
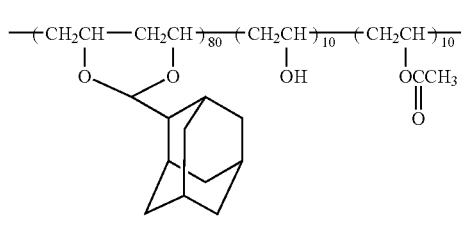
Mw38000

AP-6
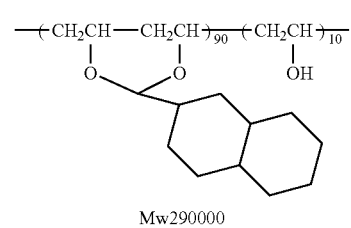
Mw290000

-continued

AP-7
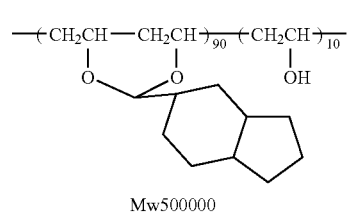
Mw500000

AP-8
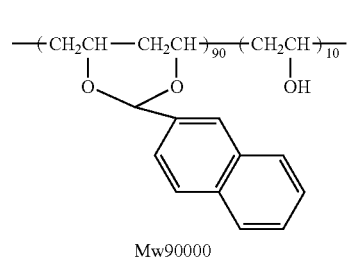
Mw90000

AP-9
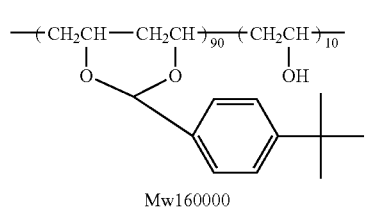
Mw160000

AP-10
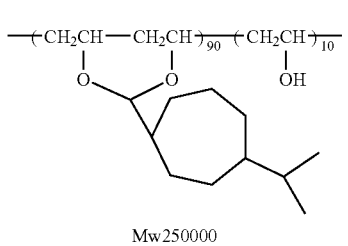
Mw250000

AP-11
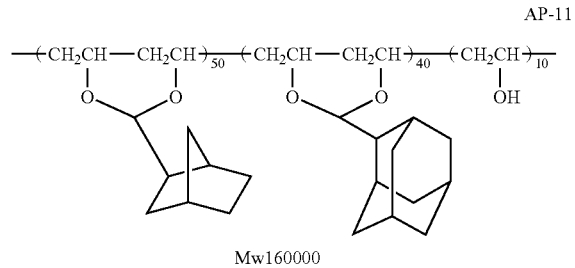
Mw160000

AP-12
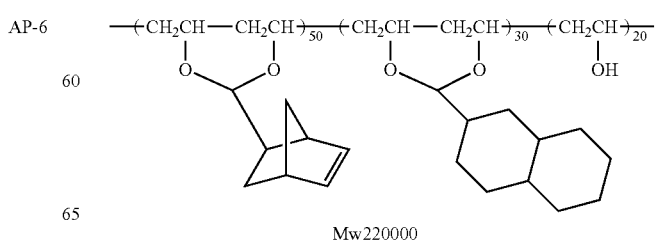
Mw220000

AP-13
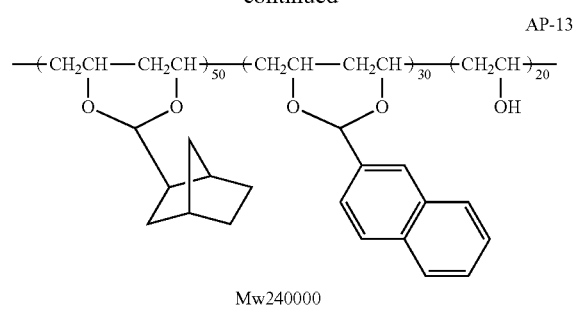
Mw240000
AP-14
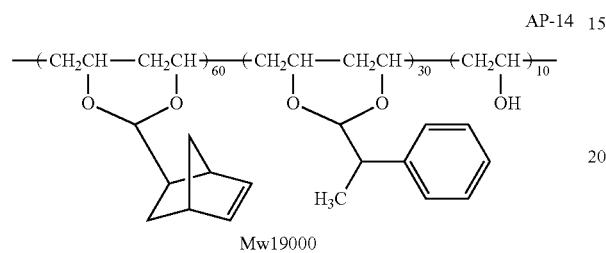
Mw19000
AP-15
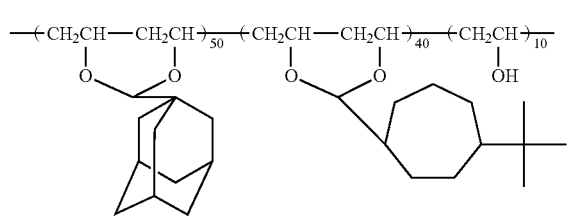
Mw430000
AP-16
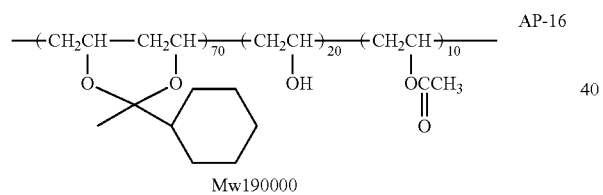
Mw190000
AP-17
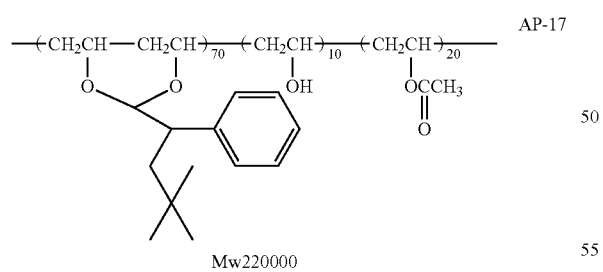
Mw220000
AP-18
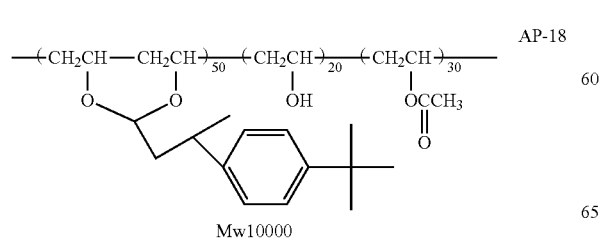
Mw10000
AP-19
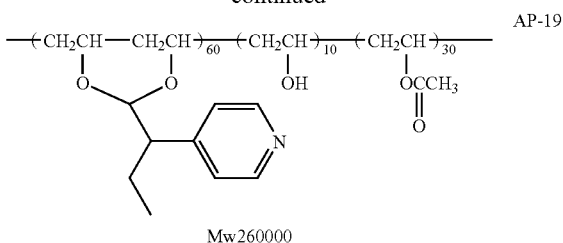
Mw260000
AP-20
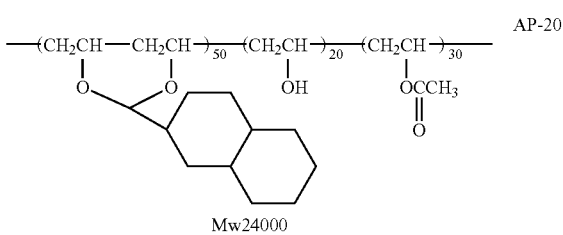
Mw24000
AP-21
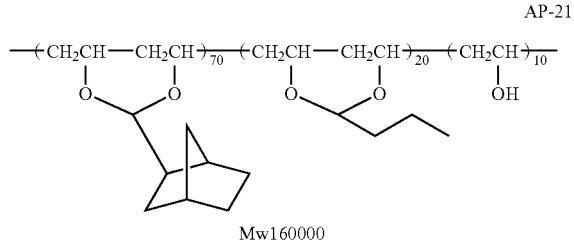
Mw160000
AP-22
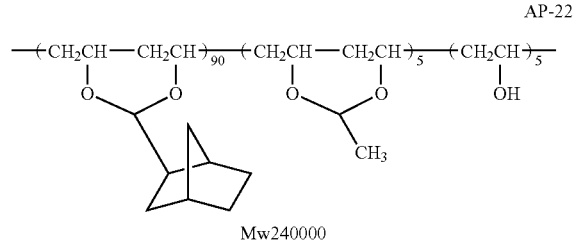
Mw240000
AP-23
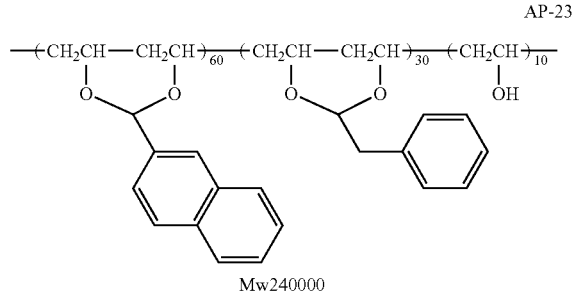
Mw240000
AP-24
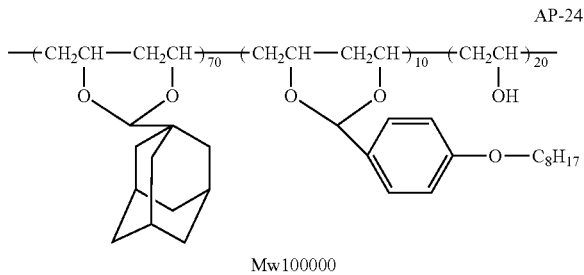
Mw100000

-continued
AP-25
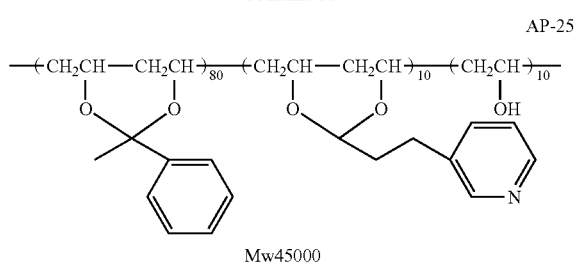
Mw45000
AP-26
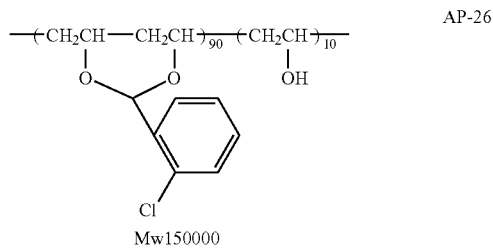
Mw150000
AP-27
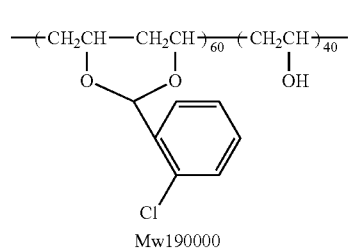
Mw190000
AP-28
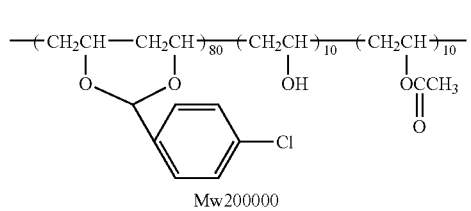
Mw200000
AP-29
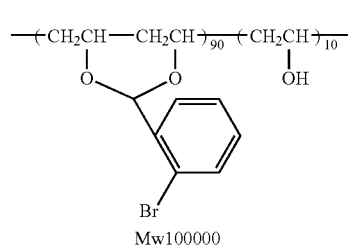
Mw100000
AP-30
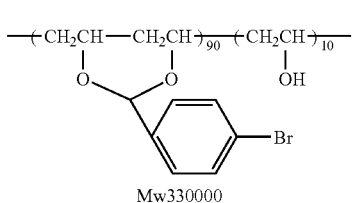
Mw330000
AP-31
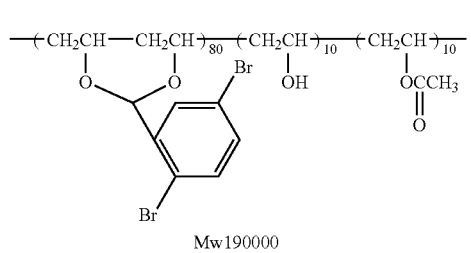
Mw190000
-continued
AP-32
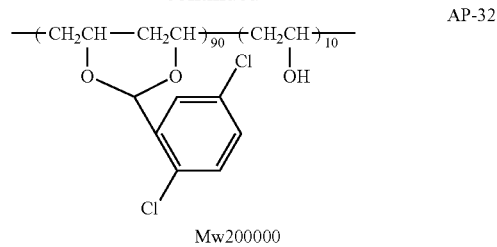
Mw200000
AP-33
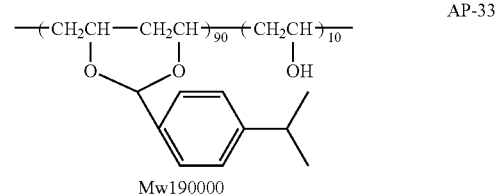
Mw190000
AP-34
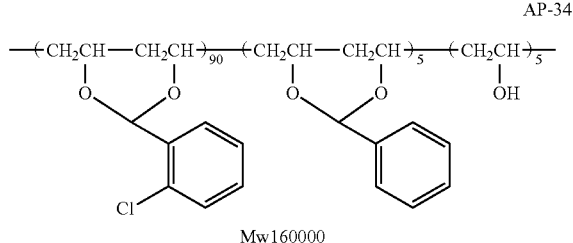
Mw160000
AP-35
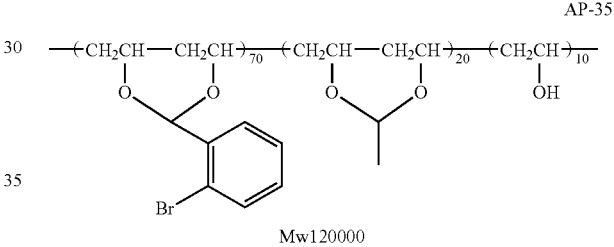
Mw120000
AP-36
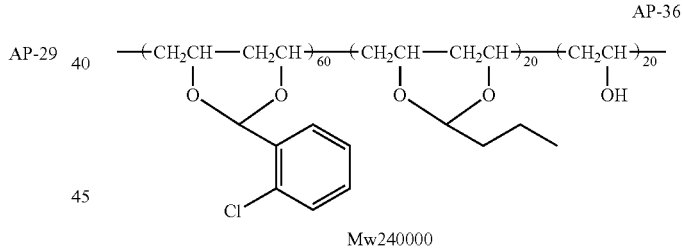
Mw240000
AP-37
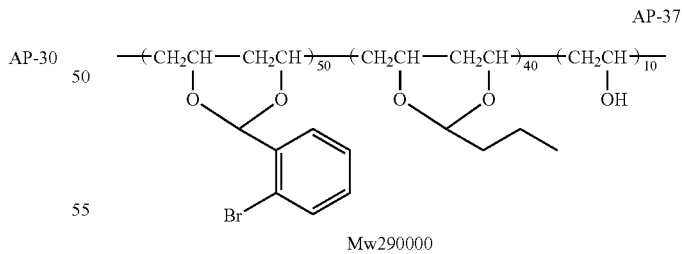
Mw290000
AP-38
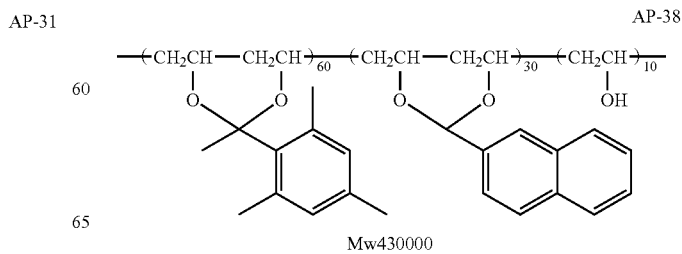
Mw430000

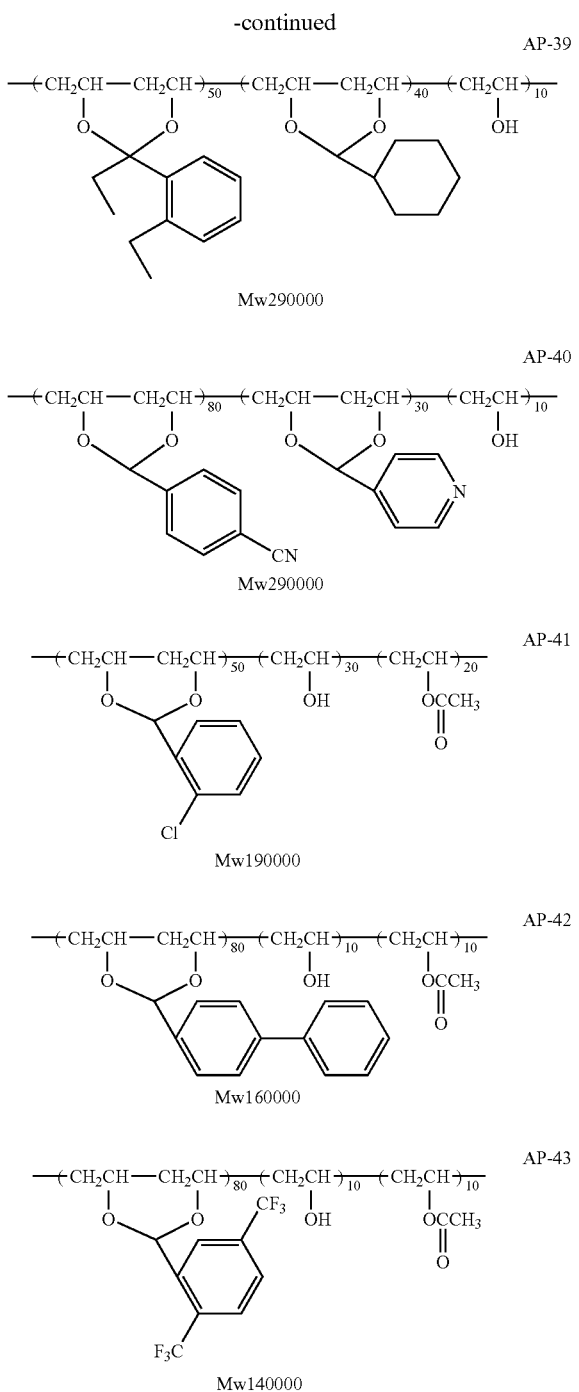

The polyvinyl acetal in the invention may be combined with any polymer. The polymer that may be combined with it is preferably transparent or semitransparent and colorless, including natural resins, polymers and copolymers, and synthetic resins, polymers and copolymers, and other film-forming media, for example, gelatins, polyvinyl alcohols, hydroxyethyl celluloses, cellulose acetates, cellulose acetate butyrates, polyvinylpyrrolidones, casein, starch, polyacrylic acids, polymethyl methacrylates, polyvinyl chlorides, polymethacrylic acids, styrene-maleic anhydride copolymers, styrene-acrylonitrile copolymers, styrene-butadiene copolymers, polyvinyl acetals (e.g., polyvinyl formal, polyvinyl butyral), polyesters, polyurethanes, phenoxy resins, polyvinylidene chlorides, polyepoxides, polycarbonates, polyvinyl acetates, polyolefins, polyamides. The binder may be formed from water or from an organic solvent or an emulsion by coating.

[Thermal Transfer Ink Sheet]

(Configuration)

The thermal transfer ink sheet of the invention contains a polyvinyl acetal modified with at least one compound of the above formula [1]. A thermal transfer recording ink sheet generally has a structure with a dye layer formed on a support, and a polyvinyl acetal modified with at least one compound of formula [1] is incorporated in the dye layer. The thermal transfer recording ink sheet of the invention may be produced by dissolving a thermal transferable dye in a solvent along with a polyvinyl acetal modified with at least one compound of formula [1] therein, or by dispersing it in a solvent as fine particles to prepare an ink, then applying the ink to a support, and suitably drying it to form a dye layer thereon.

The thermal transfer ink sheet of the invention may have any other layer than the dye layer within a range not too much detracting from the effect of the invention. For example, an interlayer may be provided between the support and the dye-donating layer; or a back layer may be provided on the surface of the support opposite to the side of the dye layer (this may be hereinafter referred to as "back surface"). The interlayer includes, for example, an undercoating layer, and a diffusion-preventing layer for preventing the dye from diffusing toward the support (hydrophilic barrier layer). The back layer is, for example, a heat-resistant slip layer, which is for preventing a thermal head from sticking to the ink sheet.

(Support)

As the support of the thermal transfer recording ink sheet of the invention, any ordinary one heretofore used as a support for ink sheets may be suitably selected and used. For example, the material described in JP-A 7-137466, paragraph [0050] may be favorably used. The thickness of the support is preferably from 2 to 30 μm.

(Dye Layer)

As the dye for use in the dye layer of the invention, any dyes may be used so long as they are thermal transferable. Typical examples of the dyes which can be used in the invention include a cyan dye, a magenta dye, a yellow dye, a black dye, an infrared dye and a ultraviolet dye etc. One or more these dyes may be used herein either singly or as combined depending on a purpose or the purpose for controlling a color phase.

As the cyan dye, for example, preferably used are those described in JP-A 3-103477, 3-150194. As the magenta dye, for example, preferably used are those described in JP-A 5-286268. As the yellow dye, for example, preferably used are those described in JP-A 1-225592.

The content of the dye in the dye layer is preferably from 0.03 to 1.0 g/m$^2$, more preferably from 0.1 to 0.6 g/m$^2$. The thickness of the dye layer is preferably from 0.2 to 5 μm, more preferably from 0.4 to 2 μm.

If desired, any kinds of conventional additives may be added to the dye layer in addition to the above resin binder and the dye. As the additive, for example, an organic fine particles such as polyethylene wax or an inorganic fine particles may be used for improving releasability from a thermal transfer image-receiving sheet or coatability of the ink. A hardener (for example, a silane coupling agent) or a releasant may also be used. Preferable releasant is a releasable graft copolymer. The releasable graft copolymer is the graft copolymer in which any one of a releasable segment selected from the group consisting of polysiloxane segment, fluorine carbon segment, fluorine hydrocarbon segment and long-chain alkyl segment is graft polymerized in the main chain thereof. More preferable is the graft copolymer in which polysiloxane segment is graft polymerized in the main chain of polyvinyl acetal resin.

The thermal transfer ink sheet of the invention is preferably fabricated by applying the coating composition for the dye layer of the invention containing the thermal transferable dye and a polyvinyl acetal modified with at least one compound of the above formula [1]. The coating composition for the dye layer of the invention is preferably prepared by dissolving the thermal transferable dye in an organic solvent or dispersing the thermal transferable dye as fine particle in a solvent. The coating composition for the dye layer of the invention may contain the additives, hardeners and releasant set forth above. The coating composition for the dye layer of the invention is applied onto a support with any ordinary known method like a gravure printing, a screen printing, a reverse roll coating with gravure coater.

In case where the invention is applied to thermal transfer recording material that enables full-color image recording, it is desirable that a cyan ink sheet containing a thermal transferable cyan dye capable of forming cyan images, a magenta ink sheet containing a thermal transferable magenta dye capable of forming magenta images, and a yellow ink sheet containing a thermal transferable yellow dye capable of forming yellow images are formed successively on a support. If desired, an ink sheet containing a black image-forming substance may be further formed. A transferable protective layer is preferably further formed.

A protective layer may be preferably coated on the outermost layer.

(Ink Cartridge and Charging Method)

The thermal transfer ink sheet of the invention may be charged in an ink cartridge. Regarding the structure of the ink cartridge and the charging method, any ones heretofore employed in the field of thermal transfer recording can be used in the invention. Concretely, the technique of cartridges as in JP-UM-A 63-161851, 1-101864 may apply also to the invention; and in particular; those described in JP-UM-A 1-101864 are more preferred.

[Thermal Transfer Recording]

In thermal transfer recording by the use of the thermal transfer ink sheet of the invention, a heating unit such as a thermal head and an image-receiving material are used as combined. Specifically, heat energy is applied to the ink sheet from a thermal head according to an image recording signal, and the dye in the part having received the heat energy is transferred to and fixed in an image-receiving sheet to attain image recording.

[Thermal Transfer Image-Receiving Sheet]

The thermal transfer image-receiving sheet to be combined with the thermal transfer ink sheet of the invention is described below.

(Configuration)

The thermal transfer image-receiving sheet has a dye-receiving layer (receiving layer) formed on a support. Preferably, an underlayer is formed between the receiving layer and the support, and for example, a white background-controlling layer, a static charge-controlling layer, an adhesive layer or a primer layer may be formed. Preferably, a heat-insulating layer is formed between the underlayer and the support. The layer between the support and the receiving layer may be referred to simply as "interlayer", and this includes the above underlayer and heat-insulating layer. The thermal transfer image-receiving sheet contains at least one receiving layer and at least one interlayer. On the back of the support, preferably formed is a curl-controlling layer, a writing layer or a static charge-controlling layer.

(Receiving Layer)

The receiving layer plays a role of receiving the dye transferred from an ink sheet and to keep the formed image.

Accordingly, a dyeable resin (dyeable receiving polymer) is used in the receiving layer.

For example, usable are polyolefin resins such as polyethylene, polypropylene; halide resins such as polyvinyl chloride, polyvinylidene chloride; vinyl resins such as polyvinyl acetate, polyacrylates; and their copolymers; polyester resins such as polyethylene terephthalate, polybutylene terephthalate; polystyrene resins, polyamide resins, polycarbonates, phenol resins, polyurethanes, epoxy resins, polysulfones, butyral resins, melamine resins, polyvinyl alcohols, copolymers of olefin such as ethylene or propylene with any other vinyl monomer; vinyl chloride-vinyl acetate copolymers, styrene-acryl copolymers, ionomers, cellulose resins, natural rubbers, synthetic rubbers; and these may be used either singly or as their mixtures; however, the invention should not be limited to these. Preferably, the receiving polymer to be used in the receiving layer is in the form of a polymer latex.

<Polymer Latex>

The polymer latex is described. In a thermal transfer image-receiving sheet, the polymer latex to be in the receiving layer is a dispersion of water-insoluble hydrophobic polymer particles dispersed in a water-soluble dispersion medium. The dispersion may be any one prepared by emulsifying a polymer in a dispersion medium, one prepared by emulsification and polymerization, one prepared by micelle dispersion, or a molecular dispersion of polymer molecules partially having a hydrophilic structure, in which the molecular chains themselves are molecularly dispersed. The polymer latex is described, for example, in Taira Okuda & Hiroshi Inagaki, "Synthetic Resin Emulsion", issued by the Polymer Publishing, 1978; Takaaki Sugimura, Yasuo Kataoka, Soichi Suzuki, & Keiji Kasahara, "Applications of Synthetic Latex", issued by the Polymer Publishing, 1993; Soichi Muroi, "Chemistry of Synthetic Latex", issued by the Polymer Publishing, 1970; Yoshiaki Miyosawa, "Development and Application of Water-Base Coating Material", by CMC, 2004; and JP-A 64-538. The mean particle size of the dispersion particles is preferably within a range of from 1 to 50000 nm, more preferably from 5 to 1000 nm. The particle size distribution of the dispersion particles is not specifically defined, and the particles may have a broad particle size distribution or may have a monodispersion particle size distribution.

The polymer latex may be an ordinary uniform-structured polymer latex, and in addition, it may also be a core/shell-structured polymer latex. In the latter case, it is often desirable that the core and the shell have a different glass transition temperature. The glass transition temperature of the polymer latex for use in the invention is preferably from −30° C. to 130° C., more preferably from 0° C. to 100° C., even more preferably from 10° C. to 80° C.

As preferred embodiments of the polymer latex, hydrophobic polymers are preferably used therein, including, for example, acrylic polymers, polyesters, rubbers (e.g., SBR resin), polyurethanes, polyvinyl chlorides, polyvinyl acetates, polyvinylidene chlorides, polyolefins. These polymers may be linear polymers, or branched polymers, or crosslinked polymers, and they may be homopolymers formed by polymerization of a single monomer or copolymers formed by copolymerization of two or more different monomers. The copolymers may be random copolymers or block copolymers. Preferably, the number-average molecular weight of the polymer is from 5000 to 1000000, more preferably from 10000 to 500000. In case where a polymer having a too small molecular weight is used, the mechanical strength of the layer containing the polymer latex may be insufficient; but when a polymer having a too large molecular weight is used; then it is unfavorable since its film formability is poor. A crosslinked polymer latex is also preferably used in the invention.

Not specifically defined, the monomer for use in producing the polymer latex may be any one capable of polymerizing in an ordinary radical polymerization or ionic polymerization method. For example, preferred are those of the following monomer groups (a) to (j). From these monomers, any ones may be independently suitably selected and combined and used in producing the polymer latex for use herein.

—Monomer Groups (a) to (j)—

(a) Conjugated dienes: 1,3-pentadiene, isoprene, 1-phenyl-1,3-butadiene, 1-α-naphthyl-1,3-butadiene, 1-β-naphthyl-1,3-butadiene, cyclopentadiene, etc.

(b) Olefins: ethylene, propylene, vinyl chloride, vinylidene chloride, 6-hydroxy-1-hexene, 4-pentenoic acid, methyl 8-nonenoate, vinylsulfonic acid, trimethylvinylsilane, trimethoxyvinylsilane, 1,4-divinylcyclohexane, 1,2,5-trivinylcyclohexane, etc.

(c) α,β-unsaturated carboxylates: alkyl acrylates (e.g., methyl acrylate, ethyl acrylate, butyl acrylate, cyclohexyl acrylate, 2-ethylhexyl acrylate, dodecyl acrylate), substituted alkyl acrylates (e.g., 2-chloroethyl acrylate, benzyl acrylate, 2-cyanoethyl acrylate), alkyl methacrylates (e.g., methyl methacrylate, butyl methacrylate, 2-ethylhexyl methacrylate, dodecyl methacrylate), substituted alkyl methacrylates (e.g., 2-hydroxyethyl methacrylate, glycidyl methacrylate, glycerin monomethacrylate, 2-acetoxyethyl methacrylate, tetrahydrofurfuryl methacrylate, 2-methoxyethyl methacrylate, polypropylene glycol monomethacrylate (molar number of added polyoxypropylene=2 to 100), 3-N,N-dimethylaminopropyl methacrylate, chloro-3-N,N,N-trimethylammoniopropyl methacrylate, 2-carboxyethyl methacrylate, 3-sulfopropyl methacrylate, 4-oxysulfobutyl methacrylate, 3-trimethoxysilylpropyl methacrylate, allyl methacrylate, 2-isocyanatoethyl methacrylate), unsaturated dicarboxylic acid derivatives (e.g., monobutyl maleate, dimethyl maleate, monomethyl itaconate, dibutyl itaconate), polyfunctional esters (e.g., ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate, 1,2,4-cyclohexane tetraacrylate), etc.

(d) α,β-unsaturated carboxylic acid amides: for example, acrylamide, methacrylamide, N-methylmethacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetacetoxyethyl)acrylamide, N-acryloylmorpholine, diacetonacrylamide, itaconic acid diamide, N-methylmaleimide, 2-acrylamide-methylpropanesulfonic acid, methylenebisacrylamide, dimethacryloylpiperazine, etc.

(e) Unsaturated nitriles: acrylonitrile, methacrylonitrile, etc.

(f) Styrene and its derivatives: styrene, vinyltoluene, p-tert-butylstyrene, vinylbenzoic acid, methyl vinylbenzoate, α-methylstyrene, p-chloromethylstyrene, vinylnaphthalene, p-hydroxymethylstyrene, sodium p-styrenesulfonate, potassium p-styrenesulfinate, p-aminomethylstyrene, 1,4-divinylbenzene, etc.

(g) Vinyl ethers: methyl vinyl ether, butyl vinyl ether, methoxyethyl vinyl ether, etc.

(h) Vinyl esters: vinyl acetate, vinyl propionate, vinyl benzoate, vinyl salicylate, vinyl chloroacetate, etc.

(i) α,β-unsaturated carboxylic acids and their salts: acrylic acid, methacrylic acid, itaconic acid, maleic acid, sodium acrylate, ammonium methacrylate, potassium itaconate, etc.

(j) Other polymerizing monomers: N-vinylimidazole, 4-vinylpyridine, N-vinylpyrrolidone, 2-vinyloxazoline, 2-isopropenyloxazoline, divinylsulfone, etc.

Polymer latex is commercially available, and the following polymers are usable. Examples of acrylic polymers are Daicel Chemical Industry's Sevian A-4635, 4718, 4601; Nippon Zeon's Nipol Lx811, 814, 821, 820, 855 (P-17: Tg 36° C.), 857x2 (P-18: Tg 43° C.); Dai-Nippon Ink Chemical's Voncoat R3370 (P-19: Tg 25° C.), 4280 (P-20: Tg 15° C.), Nippon Pure Chemicals' Jurymer ET-410 (P-21: Tg 44° C.), JSR's AE116 (P-22: Tg 50° C.), AE119 (P-23: Tg 55° C.), AE121 (P-24: Tg 58° C.), AE125 (P-25: Tg 60° C.), AE134 (P-26: Tg 48° C.), AE137 (P-27: Tg 48° C.), AE140 (P-28: Tg 53° C.), AE173 (2-29: Tg 60° C.), Toa Gosei's Aron A-104 (P-30: Tg 45° C.), Takamatsu Yushi's NS-600X, NS-620X, Nisshin Chemical Industry's Vinybran 2580, 2583, 2641, 2770, 2770H, 2635, 2886, 5202C, 2706 (all trade names).

Examples of polyesters are Dai-Nippon Ink Chemical's FINETEX ES650, 611, 675, 850, Eastman Chemical's WD-size, WMS, Takamatsu Yushi's A-110, A-115GE, A-120, A-121, A-124GP, A-124S, A-160P, A-210, A-215GE, A-510, A-513E, A-515GE, A-520, A-610, A-613, A-615GE, A-620, WAC-10, WAC-15, WAC-17XC, WAC-20, S-110, S-110EA, S-111SL, S-120, S-140, S-140A, S-250, S-252G, S-250S, S-320, S-680, DNS-63P, NS-122L, NS-122LX, NS-244LX, NS-140L, NS-141LX, NS-282LX, Toa Gosei's Aron Melt PES-1000 Series, PES-2000 Series, Toyobo's Vylonal MD-1100, MD-1200, MD-1220, MD-1245, MD-1250, MD-1335, MD-1400, MD-1480, MD-1500, MD-1930, MD-1985, Sumitomo Seika's Ceporjon ES (all trade names).

Examples of polyurethanes are Dai-Nippon Ink Chemical's HYDRAN AP10, AP20, AP30, AP40, 101H, Vondic 1320NS, 1610NS, Dainichi Seika's D-1000, D-2000, D-6000, D-4000, D-9000, Takamatsu Yushi's NS-155X, NS-310A, NS-310X, NS-311X, Dai-ichi Kogyo Pharmaceutical's Elastron (all trade names).

Examples of rubbers are LACSTAR 7310K, 3307B, 4700H, 7132C (all by Dai-Nippon Ink Chemical), Nipol Lx416, LX410, LX430, LX435, LX110, LX415A, LX438C, 2507H, LX303A, LX407BP Series, V1004, MH5055 (all by Nippon Zeon) (all trade names).

Examples of polyvinyl chlorides are Nippon Zeon's G351, G576, Nisshin Chemical Industry's Vinybran 240, 270, 277, 375, 386, 609, 550, 601, 602, 630, 660, 671, 683, 680, 680S, 681N, 685R, 277, 380, 381, 410, 430, 432, 860, 863, 865, 867, 900, 900GT, 938, 950 (all trade names). Examples of polyvinylidene chlorides are Asahi Kasei's L502, L513, Dai-Nippon Ink Chemical's D-5071 (all trade names). Examples of polyolefins are Mitsui Petrochemical's Chemipearl S120, SA100, V300 (P-40: Tg 80° C.), Dai-Nippon Ink Chemical's Voncoat 2830, 2210, 2960, Sumitomo Seika's Zaikthene, Ceporjon G; and examples of copolymer nylons are Sumitomo Seika's Ceporjon PA (all trade names).

Examples of polyvinyl acetates are Nisshin Chemical Industry's Vinybran 1080, 1082, 1085W, 1108W, 1108S, 1563M, 1566, 1570, 1588C, A22J7-F2, 1128C, 1137, 1138, A20J2, A23J1, A23K1, A23P2E, A68J1N, 1086A, 1086, 1086D, 1108S, 1187, 1241LT, 1580N, 1083, 1571, 1572, 1581, 4465, 4466, 4468W, 4468S, 4470, 4485LL, 4495LL, 1023, 1042, 1060, 1060S, 1080M, 1084W, 1084S, 1096, 1570K, 1050, 1050S, 3290, 1017AD, 1002, 1006, 1008, 1107L, 1225, 1245L, GV-6170, GV-6181, 4468W, 4468S (all trade names).

One or more these polymer latexes may be used herein either singly or as combined.

Specific examples of the structures of polymer latexes usable in the invention are shown below; however, the polymer latex usable in the invention should not be limited to these. The numerals in the formulae indicate the ratio by weight of the constitutive monomer components. Mw means a mass-average molecular weight.

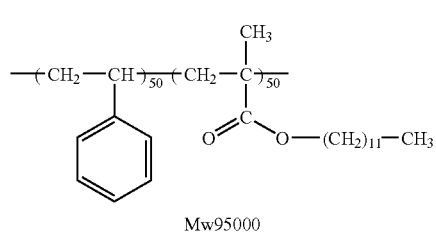

P-1

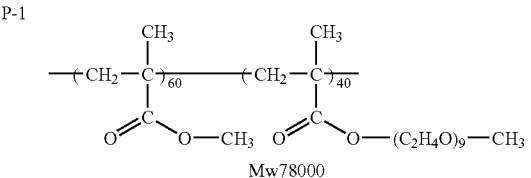

P-2

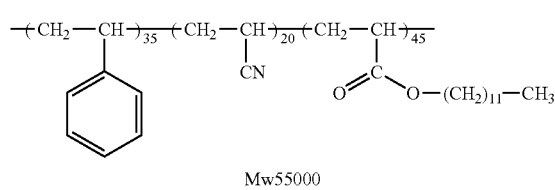

P-3

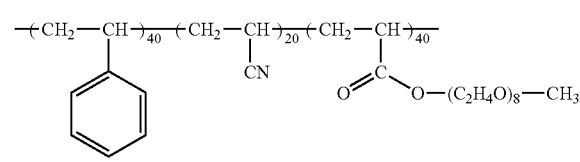

P-4

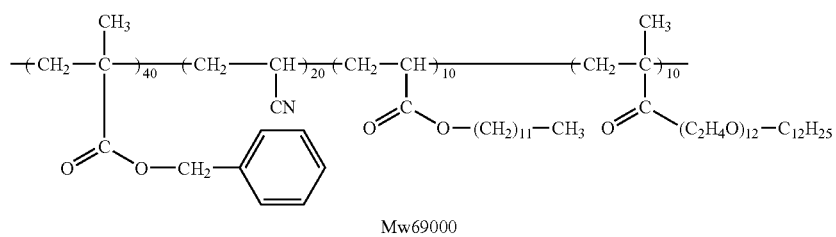

P-5

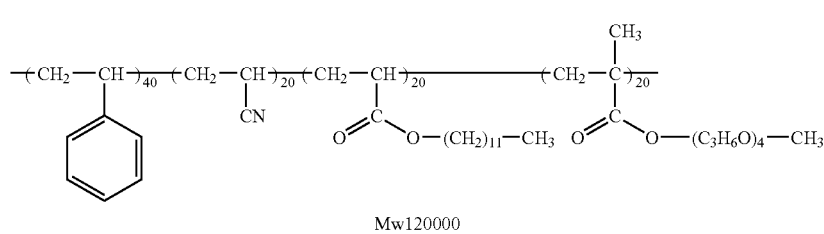

P-6

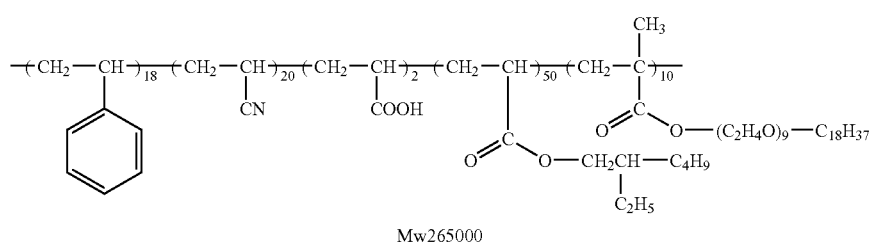

P-7

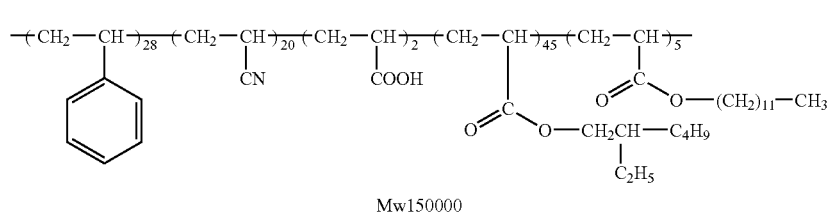

P-8

-continued
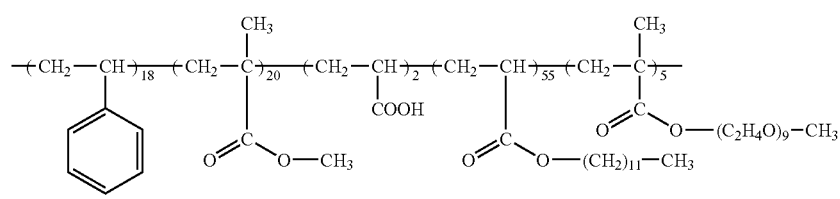
P-9
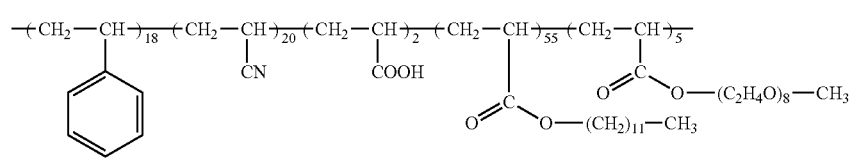
P-10
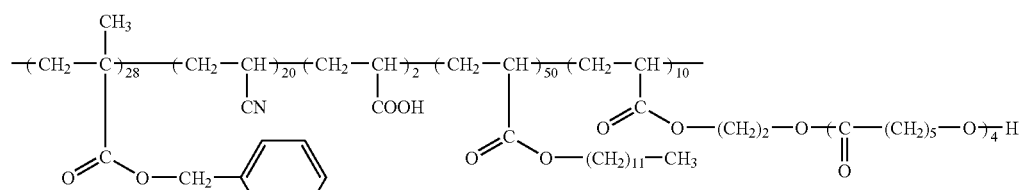
P-11
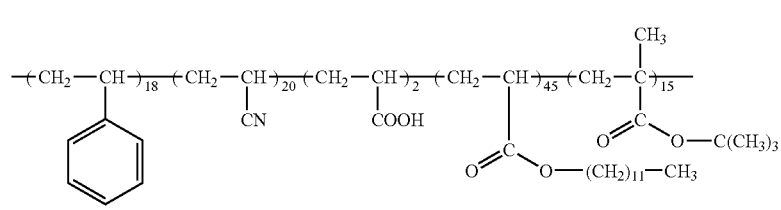
P-12
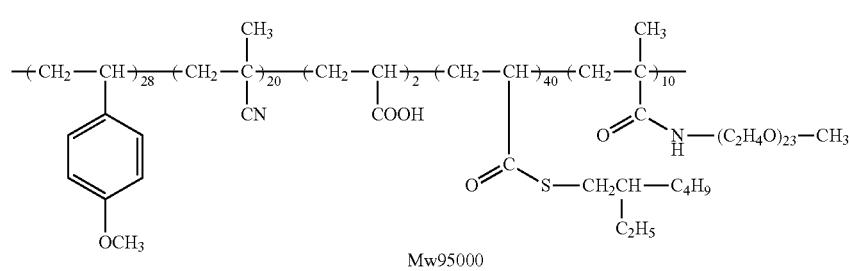
P-13
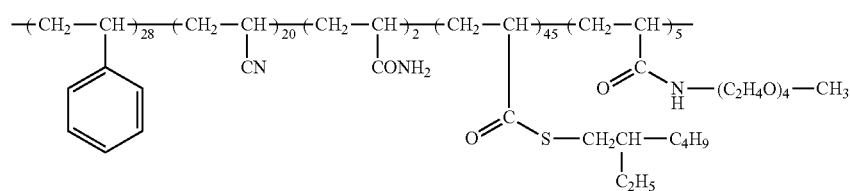
P-14
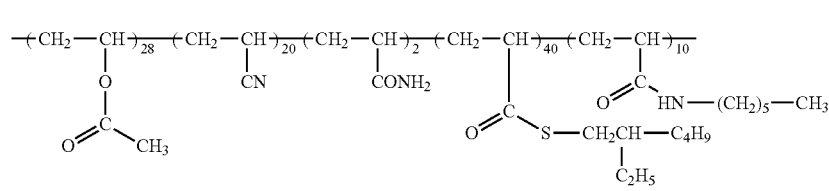
P-15

-continued
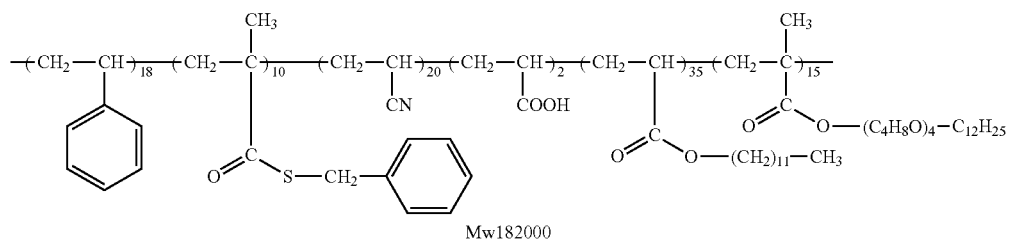
P-16
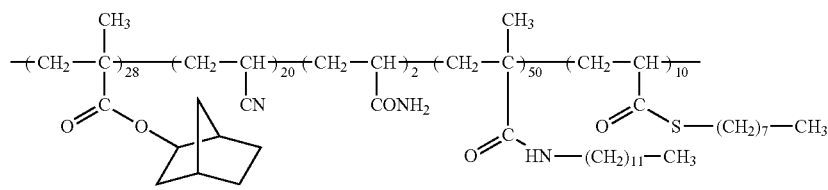
P-17
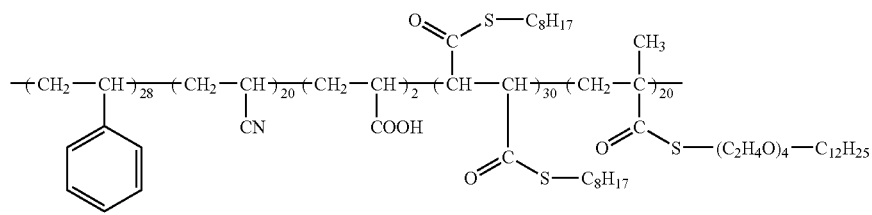
P-18
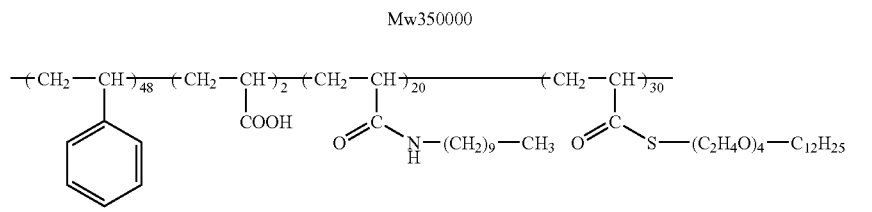
P-19
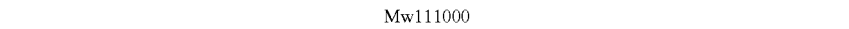
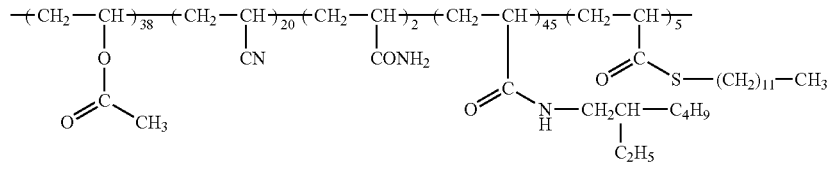
P-20
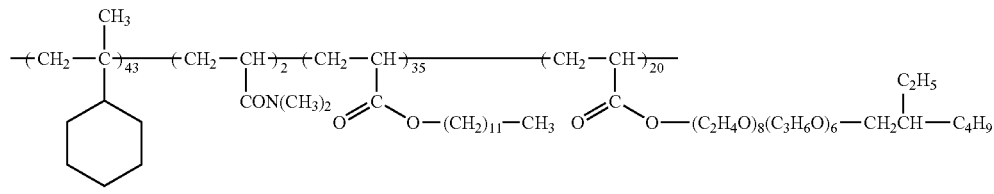
P-21
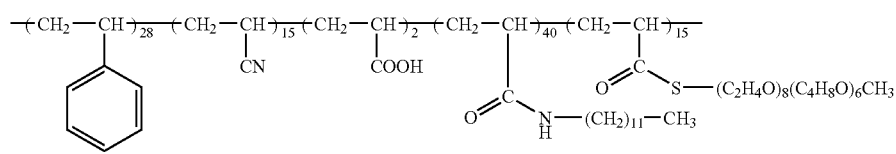
P-22

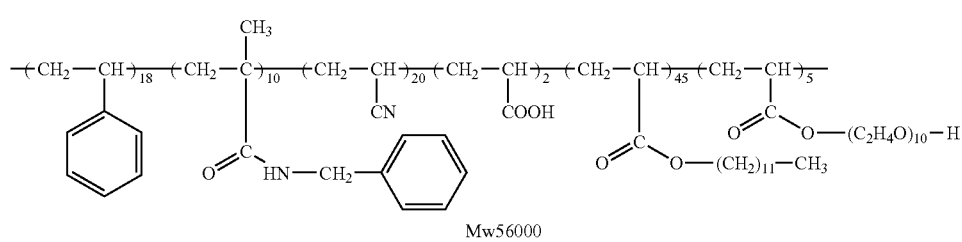

P-23

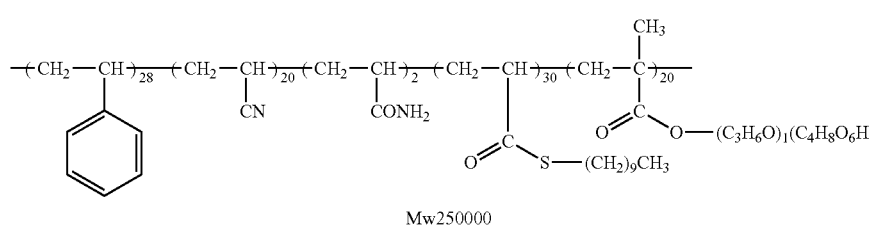

P-24

EXAMPLES

The characteristics of the invention are described more concretely with reference to Production Examples and Examples given below.

In the following Examples, the material used, its amount and the ratio, the details of the treatment and the treatment process may be suitably modified or changed not overstepping the scope of the invention. Accordingly, the invention should not be limitatively interpreted by the Examples mentioned below.

Production Example (Production of Polymer)
<Production of AP-1>

Polyvinyl alcohol (PVA110, by Kuraray) (20 g), methylene chloride (400 g), hydrochloric acid (2.0 g) and A-1 (93 g) were put into a reactor equipped with a stirrer and a reflux condenser, and heated at 40° C. for 40 hours to complete the reaction. Next, the reaction liquid was reprecipitated in methanol to obtain a reaction product. Its mass-average molecular weight was $1.5 \times 10^6$.

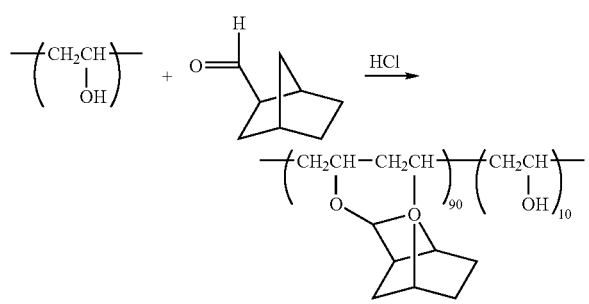

<Production of AP-2 to AP-43>

AP-2 to AP-43 were produced in the same manner as that for AP-1.

Example 1

(Fabrication of Ink Sheet)
(1) Fabrication of Sample 101 (the Invention):

A polyester film (Lumirror, trade name by Toray) having a thickness of 6.0 μm was used as a support film. A heat-resistant slip layer (thickness 1 μm) was formed on the back of the film, and to its surface, yellow, magenta and cyan compositions mentioned below were applied each as single color (coating amount of the dry film, 1 g/m²).

Yellow Ink:

| | |
|---|---|
| Dye (Macrolex Yellow 6G, trade name by Bayer) | 5.5 mas. pts. |
| Polymer AP-1 | 4.4 mas. pts. |
| Methyl ethyl ketone/toluene (1/1 by mass) | 90 mas. pts. |

Magenta Ink:

| | |
|---|---|
| Magenta dye (Disperse Red 60) | 5.5 mas. pts. |
| Polymer AP-1 | 4.4 mas. pts. |
| Methyl ethyl ketone/toluene (1/1 by mass) | 90 mas. pts. |

Cyan Ink:

| | |
|---|---|
| Cyan dye (Disperse Red 63) | 5.5 mas. pts. |
| Polymer AP-1 | 4.4 mas. pts. |
| Methyl ethyl ketone/toluene (1/1 by mass) | 90 mas. pts. |

(2) Fabrication of Sample 102 (the Invention):
A sample 102 of the invention was fabricated in the same manner as that for the sample 101, for which, however, the compound AP-1 was changed to AP-5.
(3) Fabrication of Sample 103 (the Invention):
A sample 103 of the invention was fabricated in the same manner as that for the sample 101, for which, however, the compound AP-1 was changed to AP-10.
(4) Fabrication of Sample 104 (the Invention):
A sample 104 of the invention was fabricated in the same manner as that for the sample 101, for which, however, the compound AP-1 was changed to AP-18.
(5) Fabrication of Sample 105 (the Invention):
A sample 105 of the invention was fabricated in the same manner as that for the sample 101, for which, however, the compound AP-1 was changed to AP-23.
(6) Fabrication of Sample 106 (the Invention):
A sample 106 of the invention was fabricated in the same manner as that for the sample 101, for which, however, the compound AP-1 was changed to AP-19.

(7) Fabrication of Sample 107 (the Invention):

A sample 107 of the invention was fabricated in the same manner as that for the sample 101, for which, however, the compound AP-1 (4.4 mas.pts.) was changed to AP-9 (5.5 mas.pts.).

(8) Fabrication of Sample 108 (the Invention):

A sample 108 of the invention was fabricated in the same manner as that for the sample 101, for which, however, the compound AP-1 (4.4 mas.pts.) was changed to AP-26 (5.5 mas.pts.).

(9) Fabrication of Sample 109 (the Invention):

A sample 109 of the invention was fabricated in the same manner as that for the sample 101, for which, however, the compound AP-1 (4.4 mas.pts.) was changed to AP-29 (5.5 mas.pts.)

(10) Fabrication of Sample 110 (the Invention):

A sample 110 of the invention was fabricated in the same manner as that for the sample 101, for which, however, the compound AP-1 (4.4 mas.pts.) was changed to AP-34 (5.5 mas.pts.).

(11) Fabrication of Sample 111 (the Invention):

A sample 111 of the invention was fabricated in the same manner as that for the sample 101, for which, however, the compound AP-1 (4.4 mas.pts.) was changed to AP-43 (5.5 mas.pts.).

(12) Fabrication of Sample 112 (Comparative Example):

A polyester film (Lumirror, trade name by Toray) having a thickness of 6.0 μm was used as a support film. A heat-resistant slip layer (thickness 1 μm) was formed on the back of the film, and to its surface, yellow, magenta and cyan compositions mentioned below were applied each as single color (coating amount of the dry film, 1 g/m$^2$).

Yellow Ink:

| | |
|---|---|
| Dye (Macrolex Yellow 6G, trade name by Bayer) | 5.5 mas. pts. |
| Polyvinyl butyral (Eslec BX-1, trade name by Sekisui Chemical Industry) | 4.5 mas. pts. |
| Methyl ethyl ketone/toluene (1/1 by mass) | 90 mas. pts. |

Magenta Ink:

| | |
|---|---|
| Magenta dye (Disperse Red 60) | 5.5 mas. pts. |
| Polyvinyl butyral (Eslec BX-1, trade name by Sekisui Chemical Industry) | 4.5 mas. pts. |
| Methyl ethyl ketone/toluene (1/1 by mass) | 90 mas. pts. |

Cyan Ink:

| | |
|---|---|
| Cyan dye (Disperse Red 63) | 5.5 mas. pts. |
| Polyvinyl butyral (Eslec BX-1, trade name by Sekisui Chemical Industry) | 4.5 mas. pts. |
| Methyl ethyl ketone/toluene (1/1 by mass) | 90 mas. pts. |

(13) Fabrication of Sample 113 (the Invention):

A sample 113 of the invention was fabricated in the same manner as that for the sample 112, for which, however, the amount of polyvinyl butyral in the yellow ink, magenta ink and cyan ink is changed from 4.5 to 5.5 mas.pts.

(14) Fabrication of Sample 114 (Comparative Example):

An ink sheet of Example 1 described in Japanese Patent No. 3263138 was fabricated.

(15) Fabrication of Sample 115 (Comparative Example):

An ink sheet of Example 5 described in Japanese Patent No. 3263138 was fabricated.

(16) Fabrication of Sample 116 (Comparative Example):

An ink sheet of Example 1 described in JP-A 7-23742 was fabricated.

(Fabrication of Image-Receiving Sheet)

<Image-Receiving Sheet 1>

The surface of a paper support double-laminated with polyethylene was processed for corona discharge treatment, and then a sodium dodecylbenzenesulfonate-containing gelatin underlayer was formed on it. On this, a coating composition for an interlayer A having the composition mentioned below was formed, using a bar coater, and dried, and then a coating composition for a receiving layer A having the composition mentioned below was formed, using a bar coater, and dried. The bar coating was attained at 40° C., and the drying was attained at 50° C. for 16 hours for every layer. The layer formation by coating was so controlled that the dry coating amount of the interlayer A could be 1.0 g/m$^2$ and that of the receiving layer A could be 2.5 g/m$^2$.

Coating Composition for Interlayer A:

| | |
|---|---|
| Polyester resin (Vylon 200, trade name by Toyobo) | 10 mas. pts. |
| Fluorescent brightener (Uvitex OB, trade name by Ciba-Geigy) | 1 mas. pts. |
| Titanium oxide | 30 mas. pts. |
| Methyl ethyl ketone/toluene (1/1 by mass) | 90 mas. pts. |

Coating Composition for Receiving Layer A:

| | |
|---|---|
| Polyester resin (resin described in Example 1 in JP-A 2-265789) | 100 mas. pts. |
| Amino-modified silicone (Shin-etsu Chemical Industry's trade name, X-22-3050C) | 5 mas. pts. |
| Epoxy-modified silicone (Shin-etsu Chemical Industry's trade name, X-22-300E) | 5 mas. pts. |
| Methyl ethyl ketone/toluene (1/1 by mass) | 400 mas. pts. |

(Image Formation)

The above ink sheets and the image-receiving sheet 1 were processed so as to be charged in a sublimation-type printer, Nippon Densan Copal's ASK2000 (trade name). Set in the printer, these were tested for image outputting according to a high-speed print mode to give a black solid image.

(Evaluation)

(1) Relative Transfer Density Evaluation

The visual density of the black image obtained under the above condition was determined, using Photographic Densitometer (trade name by X-Rite Incorporated). Table 1 shows the relative value of the transfer density of each sample, based on the standard value 100 of sample 106.

(2) Ink Stickiness Evaluation

For evaluation of ink stickiness, the print part giving Dmax of the image was checked for the ink stickiness condition, according to the following criteria. The obtained results are shown in Table 1.

Evaluation Ranks:

5: The image-receiving sheet smoothly peeled from the ink sheet, with no ink fusion (stickiness) to the image receiving sheet.

4: The area where the two stuck to each other was at most 1% relative to the print area of the density region that was sticky.
3: The area where the two stuck to each other was more than 1% and at most 10% relative to the print area of the density region that was sticky.
2: The area where the two stuck to each other was more than 10% and at most 20% relative to the print area of the density region that was sticky.
1: The area where the two stuck to each other was more than 20% relative to the print area of the density region that was sticky.

(3) Background Soiling Evaluation

The thermal transfer ink sheet and the image-receiving sheet were put one upon another in such a manner that the dye layer and the image-receiving layer could face each other, and this was led to pass through a hot roll laminator so that the surface temperature of the thermal transfer ink sheet could be 70° C., and then the density of the dye transferred to the dye-receiving layer was measured with Photographic Densitometer (by X-Rite Incorporated). Before and after the test, the density change (ΔD) was computed. The obtained results are shown in Table 1.

TABLE 1

|  | Relative Transfer Density | Ink Stickiness | Background Soiling |
|---|---|---|---|
| Sample 101 (Example) | 120 | 5 | 0.04 |
| Sample 102 (Example) | 125 | 5 | 0.05 |
| Sample 103 (Example) | 125 | 5 | 0.05 |
| Sample 104 (Example) | 120 | 5 | 0.04 |
| Sample 105 (Example) | 110 | 5 | 0.06 |
| Sample 106 (Example) | 125 | 5 | 0.04 |
| Sample 107 (Example) | 120 | 5 | 0.04 |
| Sample 108 (Example) | 125 | 5 | 0.03 |
| Sample 109 (Example) | 120 | 5 | 0.03 |
| Sample 110 (Example) | 125 | 5 | 0.03 |
| Sample 111 (Example) | 110 | 5 | 0.04 |
| Sample 112 (Comparative Example) | 100 | 5 | 0.09 |
| Sample 113 (Comparative Example) | 100 | 5 | 0.08 |
| Sample 114 (Comparative Example) | 110 | 3 | 0.11 |
| Sample 115 (Comparative Example) | 105 | 3 | 0.04 |
| Sample 116 (Comparative Example) | 100 | 5 | 0.08 |

As is obvious from the results in Table 1, the samples 112, 113, 115 and 116 could not give an increased relative transfer density in high-speed transfer recording. The sample 115 gave an increased relative transfer density, but had a problem of ink stickiness.

It is known that the samples 101 to 111 of the invention all had an excellent relative transfer density with no ink stickiness. Accordingly, using the specific resin binder in the invention makes it possible to provide a thermal transfer ink sheet of high sensitivity with few surface defects.

Example 2

Samples were fabricated in the same manner as in Example 1, for which, however, the image-receiving sheet 1 was changed to an image-receiving sheet 2 mentioned below.
<Image-Receiving Sheet 2>
The surface of a paper support double-laminated with polyethylene was processed for corona discharge treatment, and then a sodium dodecylbenzenesulfonate-containing gelatin underlayer was formed on it. On this, a coating composition for an interlayer B and a coating composition for a receiving layer B each having the composition mentioned below were laminated by coating in that order from the support, according to the method illustrated in FIG. 9 in U.S. Pat. No. 2,761,791. Immediately after the coating, this was dried at 50° C. for 16 hours. The layer formation was so controlled that the dry coating amount of the interlayer B could be 15 g/m$^2$ and that of the receiving layer B could be 2.5 g/m$^2$.

Coating Composition for Interlayer B:

| Hollow polymer latex (MH5055, trade name by Nippon Zeon) | 563 mas. pts. |
| Gelatin | 120 mas. pts. |

In this, the hollow polymer latex is an aqueous dispersion of a hollow-structured polymer having an outer diameter of 0.5 μm.

Coating Composition for Receiving Layer B:

| Polymer P-9 | 48 mas. pts. |
| Benzotriazole-type UV absorbent polymer latex (ULS1700, trade name by Ipposha Yushi Kogyo) | 15 mas. pts. |
| Montan wax (J537, trade name by Chukyo Yushi) | 10 mas. pts. |

(Image Formation)

The above ink sheets obtained in Example 1 and the image-receiving sheet 2 were processed in the same manner as that for Example 1 and images were formed. The samples were tested in the same manner as in Example 1. The results are shown in Table 2.

TABLE 2

|  | Relative Transfer Density | Ink Stickiness | Background Soiling |
|---|---|---|---|
| Sample 101 (Example) | 125 | 5 | 0.04 |
| Sample 102 (Example) | 130 | 5 | 0.05 |
| Sample 103 (Example) | 130 | 5 | 0.05 |
| Sample 104 (Example) | 125 | 5 | 0.04 |
| Sample 105 (Example) | 120 | 5 | 0.05 |
| Sample 106 (Example) | 130 | 5 | 0.04 |
| Sample 107 (Example) | 125 | 5 | 0.05 |
| Sample 108 (Example) | 130 | 5 | 0.05 |
| Sample 109 (Example) | 125 | 5 | 0.05 |
| Sample 110 (Example) | 130 | 5 | 0.05 |
| Sample 111 (Example) | 120 | 5 | 0.05 |
| Sample 112 (Comparative Example) | 100 | 5 | 0.09 |
| Sample 113 (Comparative Example) | 100 | 5 | 0.09 |
| Sample 114 (Comparative Example) | 110 | 4 | 0.12 |
| Sample 115 (Comparative Example) | 105 | 4 | 0.05 |
| Sample 116 (Comparative Example) | 100 | 5 | 0.08 |

The samples 101 to 111 of the invention all had an excellent relative transfer density with no ink stickiness in this Example, and their relative transfer density was higher than that in Example 1.

The present disclosure relates to the subject matter contained in Japanese Patent Application No. 092240/2007 filed on Mar. 30, 2007, Japanese Patent Application No. 226265/2007 filed on Aug. 31, 2007 and Japanese Patent Application No. 226266/2007 filed on Aug. 31, 2007, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A thermal transfer ink sheet comprising, as formed on a support, a dye layer containing a thermal transferable dye in a resin binder, wherein the dye layer contains a polyvinyl acetal modified with at least one compound of the following formula [1]:

[1]

wherein $R^1$ is a substituted linear alkyl group, a substituted branched alkyl group, or a substituted or unsubstituted cyclic group, and $R^2$ is a hydrogen atom, a substituted or unsubstituted linear alkyl group, a substituted or unsubstituted branched alkyl group, or a substituted or unsubstituted cyclic group, with the proviso that when $R^1$ is a monophenyl alkyl group or an unsubstituted phenyl group, $R^2$ is not a hydrogen atom.

2. The thermal transfer ink sheet according to claim 1, wherein one of $R^1$ and $R^2$ is a crosslinked cyclic group, a condensed cyclic group, an aliphatic carbon mono-cyclic group or a hetero-cyclic group.

3. The thermal transfer ink sheet according to claim 1, wherein one of $R^1$ and $R^2$ is a crosslinked cyclic group or a condensed cyclic group.

4. The thermal transfer ink sheet according to claim 1, wherein one of $R^1$ and $R^2$ is a crosslinked alicyclic group or a condensed alicyclic group.

5. The thermal transfer ink sheet according to claim 1, wherein $R^1$ is a substituted phenyl group and $R^2$ is a hydrogen atom, a linear alkyl group or a branched alkyl group.

6. The thermal transfer ink sheet according to claim 1, wherein $R^1$ is an alkyl substituted phenyl group, an alkoxy substituted phenyl group or a halophenyl group.

7. The thermal transfer ink sheet according to claim 1, wherein $R^1$ is a halophenyl group.

8. An ink cartridge filled with the thermal transfer ink sheet of claim 1.

9. A thermal transfer recording method comprising forming an image by applying heat to the thermal transfer ink sheet of claim 1 on an image-receiving sheet comprising a polymer latex-containing ink-receiving layer on a support.

10. A coating composition for the dye layer of a thermal transfer ink sheet, containing a thermal transferable dye and a polyvinyl acetal modified with at least one compound of the following formula [1]:

[1]

wherein $R^1$ is a substituted linear alkyl group, a substituted branched alkyl group, or a substituted or unsubstituted cyclic group, and $R^2$ is a hydrogen atom, a substituted or unsubstituted linear alkyl group, a substituted or unsubstituted branched alkyl group, or a substituted or unsubstituted cyclic group, with the proviso that when $R^1$ is a monophenyl alkyl group or an unsubstituted phenyl group, $R^2$ is not a hydrogen atom.

* * * * *